(12) United States Patent
Holt et al.

(10) Patent No.: US 6,655,136 B2
(45) Date of Patent: Dec. 2, 2003

(54) SYSTEM AND METHOD FOR ACCUMULATING HYDRAULIC FLUID

(75) Inventors: Bradford J. Holt, Peoria, IL (US); John Krone, Dunlap, IL (US); Andrew Nippert, Peoria, IL (US)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 15 days.

(21) Appl. No.: 10/024,312

(22) Filed: Dec. 21, 2001

(65) Prior Publication Data

US 2003/0115863 A1 Jun. 26, 2003

(51) Int. Cl.[7] .............................................. F16D 31/02
(52) U.S. Cl. ........................................ 60/414; 60/469
(58) Field of Search ................................... 60/414, 469

(56) References Cited

U.S. PATENT DOCUMENTS

| | | | |
|---|---|---|---|
| 4,046,270 A | 9/1977 | Baron et al. | |
| 4,539,814 A | 9/1985 | McKie | |
| 4,581,893 A | 4/1986 | Lindbom | |
| 4,590,763 A | 5/1986 | Augoyard et al. | |
| 5,116,188 A | 5/1992 | Kurohashi et al. | 60/413 |
| 5,195,864 A | 3/1993 | Drake et al. | 60/469 |
| 5,477,677 A | 12/1995 | Krnavek | |
| 5,733,095 A | 3/1998 | Palmer et al. | 60/413 |
| 5,802,847 A | 9/1998 | Harnischfeger | 60/413 |
| 5,878,569 A | 3/1999 | Satzler | 60/418 |
| 6,009,708 A | 1/2000 | Miki et al. | |
| 6,279,316 B1 * | 8/2001 | Vigholm | 60/469 |
| 6,502,393 B1 * | 1/2003 | Stephenson et al. | 60/414 |

FOREIGN PATENT DOCUMENTS

WO    WO 00/00748    1/2000

* cited by examiner

*Primary Examiner*—F. Daniel Lopez
(74) *Attorney, Agent, or Firm*—Finnegan, Henderson, Farabow, Garrett & Dunner

(57) ABSTRACT

A hydraulic system is provided. The hydraulic system includes a a hydraulic actuator, a source of pressurized fluid, and a directional control valve controlling fluid flow into and out of the hydraulic actuator. An accumulator is disposed between a fluid input line and a fluid output line for the directional control valve. A regeneration control valve is disposed between the accumulator and the output of the source of pressurized fluid. A storage control valve is disposed between the fluid output line and a tank of the hydraulic system.

24 Claims, 3 Drawing Sheets

US 6,655,136 B2

SYSTEM AND METHOD FOR ACCUMULATING HYDRAULIC FLUID

TECHNICAL FIELD

The present application is directed to a system and method for accumulating hydraulic fluid. More particularly, the present invention is directed to a hydraulic system that uses an accumulator and control valves to store and regenerate energy.

BACKGROUND

Work machines are commonly used to move heavy loads, such as earth, construction material, and/or debris. These work machines, which may be, for example, wheel loaders, excavators, bull dozers, backhoes, telehandlers, and track loaders, typically include different types of work implements that are designed to perform various moving tasks. The work implements of these work machines are commonly powered by hydraulic systems, which use pressurized fluid to move the work implements.

A hydraulic system for an work machine typically includes a source of pressurized fluid, such as, for example, a pump, that is connected to a hydraulic actuator. A directional control valve is positioned between the source of pressurized fluid and the hydraulic actuator to control the flow of pressurized fluid into the actuator. When the control valve is opened, pressurized fluid is directed into one of two chambers in the hydraulic actuator. The fluid exerts a force on a moveable element in the hydraulic actuator, which causes the moveable element to move. The moveable element is, in turn, connected to the work implement. Movement of the moveable element translates to a corresponding movement in the work implement. When the moveable element moves, fluid is forced out of the second chamber of the hydraulic actuator.

Typically, the directional control valve directs the escaping fluid to a fluid reservoir tank or similar fluid receptacle.

In many situations, the work implement of the work machine is raised to an elevated position. As the work implement may be relatively heavy, the work implement gains significant potential energy when raised to the elevated position. When the work implement is released from the elevated position this potential energy is usually converted to heat when the pressurized fluid is throttled across a valve and returned to the tank. Some of the potential energy of a work implement in an elevated position may be captured by directing the pressurized fluid that escapes from the second chamber into an accumulator, which stores the fluid under pressure.

An exemplary hydraulic system on a work machine using a fluid accumulator for recovering or recycling load energy from a lifting cylinder is described in International Publication No. WO 00/00748 to Laars Bruun. As described therein however, an additional pump operated by the drive unit of the work machine is required to communicate fluid between the accumulator and the head end of the lifting cylinder. Depending upon the desired direction of movement of the lift cylinder, and the pressure difference between accumulator and cylinder, the drive unit supplies energy to, or receives energy from, the hydraulic circuit.

Another known use of an accumulator is to provide ride control. When an operator moves the earth moving machine over an uneven surface, such as when carrying a load around a job site, the work implement tends to bounce and jar if held rigidly by the hydraulic system. The bouncing of the work implement may be decreased by connecting the accumulator to the load bearing chamber of the hydraulic actuator. The pressurized fluid stored in the accumulator acts as a shock absorber and reduces the bouncing of the work implement. In this manner, a smoother ride for the earth moving machine may be achieved. The energy required to charge the accumulator to the same pressure as the cylinder prior to initiating ride control is commonly provided entirely by the pump however, and no provision is made for making use of that stored energy when ride control is terminated.

The hydraulic system of the present invention solves one or more of the problems set forth above.

SUMMARY OF THE INVENTION

One aspect of the present invention is directed to a hydraulic system that includes a hydraulic actuator, a source of pressurized fluid, and a directional control valve controlling fluid flow into and out of the hydraulic actuator. An accumulator is disposed between a fluid input line and a fluid output line for the directional control valve. A regeneration control valve is disposed between the accumulator and the output of the source of pressurized fluid. A storage control valve is disposed between the fluid output line and a tank of the hydraulic system.

In another aspect, the present invention is directed to a method of regenerating energy in a hydraulic system. Pressurized fluid is from one of a plurality of hydraulic actuators using a directional control valve. At least a portion of the fluid released from the hydraulic actuator is stored under pressure in an accumulator disposed between a fluid input line and a fluid output line of the directional control valve. Energy stored in the accumulator is regenerated by releasing the fluid stored under pressure to operate a hydraulic actuator.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
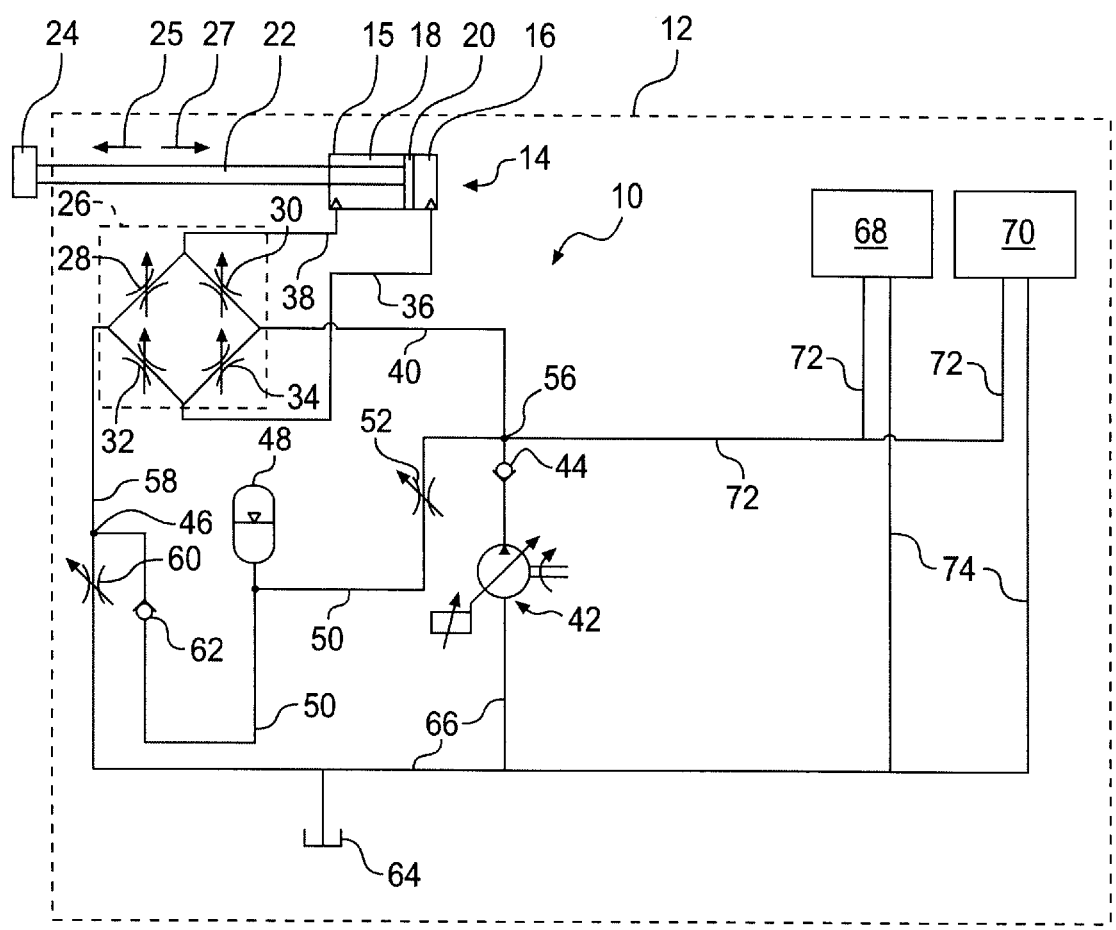
FIG. 1 is a schematic and diagrammatic illustration of a hydraulic system in accordance with one exemplary embodiment of the present invention.

As diagrammatically illustrated in FIG. 1, a hydraulic system 10 is provided for an work machine 12. Work machine 12 may be any mobile machine that includes a hydraulically powered work implement 24. Work machine 12 may be, for example, a wheel loader, excavator, bull dozer, track loader, backhoe, telehandler or digger.

Work implement 24 may be any type of implement commonly placed on any work machine 12. Work implement 24 may be, for example, a loader, shovel, bucket, blade, or fork. For the purposes of the present disclosure, the term "work implement" may also include the individual components of the work implement, such as a boom or stick.

As also shown in FIG. 1, a hydraulic actuator 14 is operatively connected to work implement 24. Hydraulic actuator 14 may be, for example, a hydraulic cylinder configured to move a work implement. As used herein, the term hydraulic actuator includes a hydraulic cylinder (as illustrated in the accompanying Figures) or another type of hydraulically powered device, such as a fluid motor or hydrostatic drive train.

As shown in FIG. 1, hydraulic actuator 14 includes a piston 20 that is slidably disposed in a housing 15. Piston 20 defines a first chamber 16 and a second chamber 18. A rod 22 connects piston 20 to work implement 24. Sliding movement of piston 20 within housing 15 translates to a corresponding movement of work implement 24.

As also illustrated in FIG. 1, hydraulic system 10 includes a tank 64. Tank 64 contains a reservoir of fluid for use by hydraulic system 10. The fluid stored within tank 64 may be at an ambient pressure.

As also illustrated in FIG. 1, hydraulic system 10 includes a source of pressurized fluid 42. Source of pressurized fluid 42 may be any device capable of pressurizing fluid. Source of pressurized fluid 42 may be, for example, a piston pump, gear pump, vane pump, or gerotor pump. Source of pressurized fluid 42 may also have a variable displacement capacity (as illustrated in the accompanying Figures) or may have a fixed capacity.

Source of pressurized fluid 42 is connected at an inlet port to tank 64 through a fluid line 66. In operation, source of pressurized fluid 42 draws fluid from tank 64 at ambient or low charge pressure and works the fluid to produce pressurized fluid flow to an outlet port at a junction 56. As illustrated, a check valve 44 may be disposed between source of pressurize fluid 42 and junction 56, to prevent an undesirable reverse flow of fluid.

Source of pressurized fluid 42 provides the pressurized fluid to at least one hydraulic actuator 14 through a directional control valve 26. A fluid input line 40 connects junction 56 associated with source of pressurized fluid 42 to directional control valve 26. A fluid line 36 connects directional control valve 26 to first chamber 16 and a fluid line 38 connects directional control valve 26 to second chamber 18. Directional control valve 26 is connected to tank 64 through a fluid output line 58.

Directional control valve 26 may be any device configured to control the fluid flow rate into and out of hydraulic actuator 14 and, more particularly, into and out of first and second chambers 16 and 18. Directional control valve 26 may be a set of independent metering valves (as shown in the accompanying Figures), single spool valves or other type of proportional control valve arrangement. It is contemplated that additional devices that may be used as a directional control valve will be readily apparent to one skilled in the art.

As shown in FIG. 1, directional control valve 26 may include a first metering valve 28, a second metering valve 30, a third metering valve 32, and a fourth metering valve 34. Each of the metering valves are independently controllable to selectively allow or restrict a flow of fluid therethrough. By controlling the direction and rate of fluid flow to first and second chambers 16 and 18 of hydraulic actuator 14, directional control valve 26 may control the motion of work implement 24.

For example, to move work implement 24 in the direction indicated by arrow 25, first metering valve 28 and fourth metering valve 34 are opened while second metering valve 30 and third metering valve 32 are closed. This allows pressurized fluid to flow from source of pressurized fluid 42 through fourth metering valve 34 and fluid line 36 into first chamber 16. Fluid is also allowed to leave second chamber 18 through fluid line 38 and first metering valve 28 and flow towards tank 64.

To move work implement 24 in the direction indicated by arrow 27, first metering valve 28 and fourth metering valve 34 are closed and second metering valve 30 and third metering valve 32 are opened. This will allow pressurized fluid to flow from source of pressurized fluid 42 to second chamber 18 and from first chamber 16 towards tank 64.

As further illustrated in FIG. 1, an accumulator 48 may be disposed between fluid input line 40 and fluid output line 58, connected in parallel with directional control valve 26 between tank 64 and source of pressurized fluid 42.

A junction 46 is provided fluid output line 58, which connects directional control valve 26 with accumulator 48 and tank 64. A fluid line 50 connects accumulator 48 to junctions 46 and 56.

In addition, a regeneration control valve 52 is disposed in fluid line 50 between accumulator 48 and junction 56, and may be a proportional valve. When control valve 52 is open, pressurized fluid may be metered out of accumulator 48 to junction 56, in order to supplement or replace fluid flow normally provided by source of pressurized fluid 42 to actuator 14 or another actuator or auxiliary device, regenerating energy stored in the accumulator. When control valve 52 is closed, fluid is prevented from flowing out of accumulator 48.

A storage control valve 60 may also be disposed between junction 46 and tank 64, and may be a proportional valve. When control valve 60 is open fluid may be metered through fluid output line 58 to tank 64, and the degree of throttling by control valve 60 will determine the fluid pressure at junction 46. When control valve 60 is closed, fluid is prevented from flowing to tank 64.

As shown in FIG. 1, a check valve 62 may be disposed in fluid line 50 between junction 46 and accumulator 48. Check valve 62 prevents fluid from escaping from accumulator 48 into fluid output line 58. When work implement 24 is in an elevated position, the weight of work implement 24 will exert a force through rod 22 on piston 20. The force of piston 20 will act against the fluid in one of the first and second chambers 16 and 18. For example, if arrow 27 represents a lowering direction of work implement 24, the weight of the implement on piston 20 will pressurize the fluid in first chamber 16. In order to lower the work implement 24, third metering valve 32 will be opened to allow this pressurized fluid to flow towards tank 64. This pressurized fluid may be captured in accumulator 48 by closing, partially or completely, control valves 60 and 52. In this manner, the potential energy of associated with the raised work implement 24 may be re-captured as stored pressurized fluid in accumulator 48.

The fluid may also be directed to accumulator 48 at an increased pressure when the operator initiates a certain operation. For example, an operator of a loader may initiate the "return to dig" function, which causes the release of the work implement from an elevated position to return to a ground position. In response, the system may autonomously allow work implement 24 to drop quickly by opening second metering valve 30, third metering valve 32, and control valve 60. This allows pressurized fluid to flow from source of pressurized fluid 42 into second chamber 18 and from first chamber 16 to tank 64, thereby allowing work implement to move in the direction indicated by arrow 27. The velocity at which work implement 24 drops may be controlled by modulating either third metering valve 32 or control valve 60, but a more rapid descent increases the amount of kinetic energy in the form of momentum available for storage, as described hereinafter. When work implement 24 develops sufficient kinetic energy, such as, for example, when work implement 24 has traveled 75% of the way from the elevated position to the ground position, the system may begin to close control valve 60. The closing of control valve 60 while the implement is dropping quickly may create a sharp rise in pressure in line 58, as the fluid flowing out of the first chamber 16 is abruptly forced to flow through check valve 62 and into accumulator 48. Increasing pressure in the accumulator will gradually bring the work implement 24 to a halt as the kinetic energy is absorbed, and pressure of the stored fluid equals or exceeds the pressure produced by the weight of the implement on the first chamber.

It is contemplated that a "learning algorithm" may be programmed into the control system for hydraulic system 10. The learning algorithm may monitor the fluid pressure at different locations within the system during certain loading operations. Based on the information obtained during this monitoring, the control system may adjust the opening and closing of control valve 60 to maximize the energy regeneration efficiency.

Accumulator 48 may be sized to accommodate the entire volume of first chamber 16. Alternatively, with the recognition that some fluid released from first chamber 16 may not be recoverable, accumulator 48 may be sized smaller than the volume of first cylinder 16. The sizing of accumulator 48 should maximize pressurized fluid storage and the resulting regeneration benefit, while minimizing the amount of throttling required to bring work implement 24 to a controlled stop.

The pressurized fluid stored in accumulator 48 may be used by hydraulic system 10 for both energy regeneration and for ride control. To regenerate the pressurized fluid in accumulator 48, control valve 52 is opened, partially of completely. This allows the pressurized fluid to flow to junction 56 to augment the flow of fluid provided by source of pressurized fluid 42. The pressurized fluid may then be directed into either of first and second chambers 16 and 18 of hydraulic actuator 14 and used to move work implement 24, or utilized elsewhere in the hydraulic system in another actuator or other auxiliary device. Through this process, the potential energy of work implement 24 may be captured by storing pressurized fluid in accumulator 48 and regenerated as energy used to perform useful work at a later time.

As shown in FIG. 1, work machine 12 may include a plurality of hydraulic actuators, such as second hydraulic actuator 68 and a third hydraulic actuator 70. Fluid lines 72 are connected to fluid input line 40 at junction 56. When control valve 52 is opened, pressurized fluid stored in accumulator 48 may be directed to second and third hydraulic actuators 68 and 70. Thus, the pressurized fluid captured from hydraulic actuator 14 may be either returned to hydraulic actuator 14 or provided to second and/or third hydraulic actuators 68 and 70.

Figure 2:
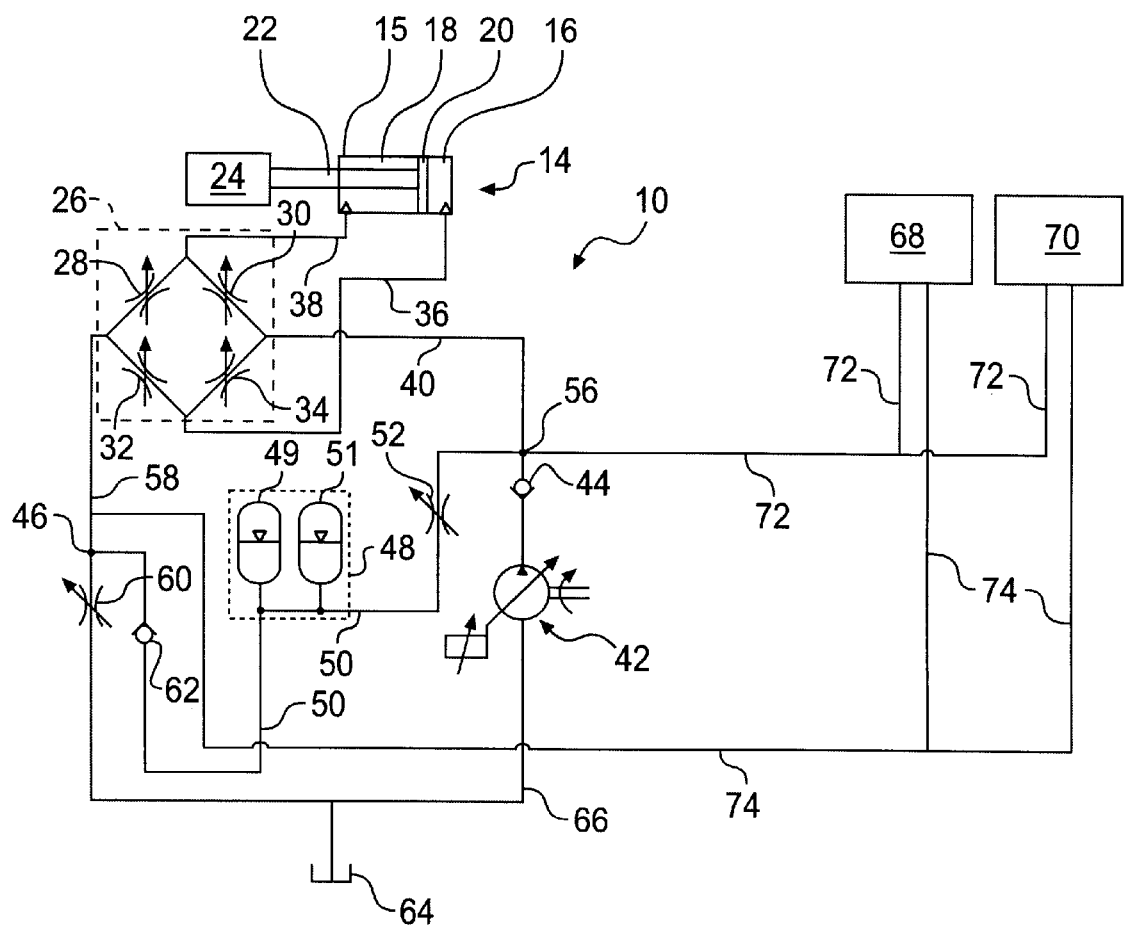
FIG. 2 is a schematic and diagrammatic illustration of a hydraulic system in accordance with another exemplary embodiment of the present invention.

As shown in FIG. 1, fluid lines 74 connect second and third hydraulic actuators 68 and 70 to tank 64. Alternatively, as illustrated in FIG. 2, fluid lines 74 may connect second and third hydraulic actuators 68 and 70 to fluid output line 58 upstream of junction 46. In this manner, fluid released from either of second and third hydraulic actuators 68 and 70 may also be directed to accumulator 48 by modulating control valve 60. It is also contemplated that pressurized fluid released from other components on work machine 12, such as, for example, drive train functions, may also be directed into accumulator 48.

Figure 3:
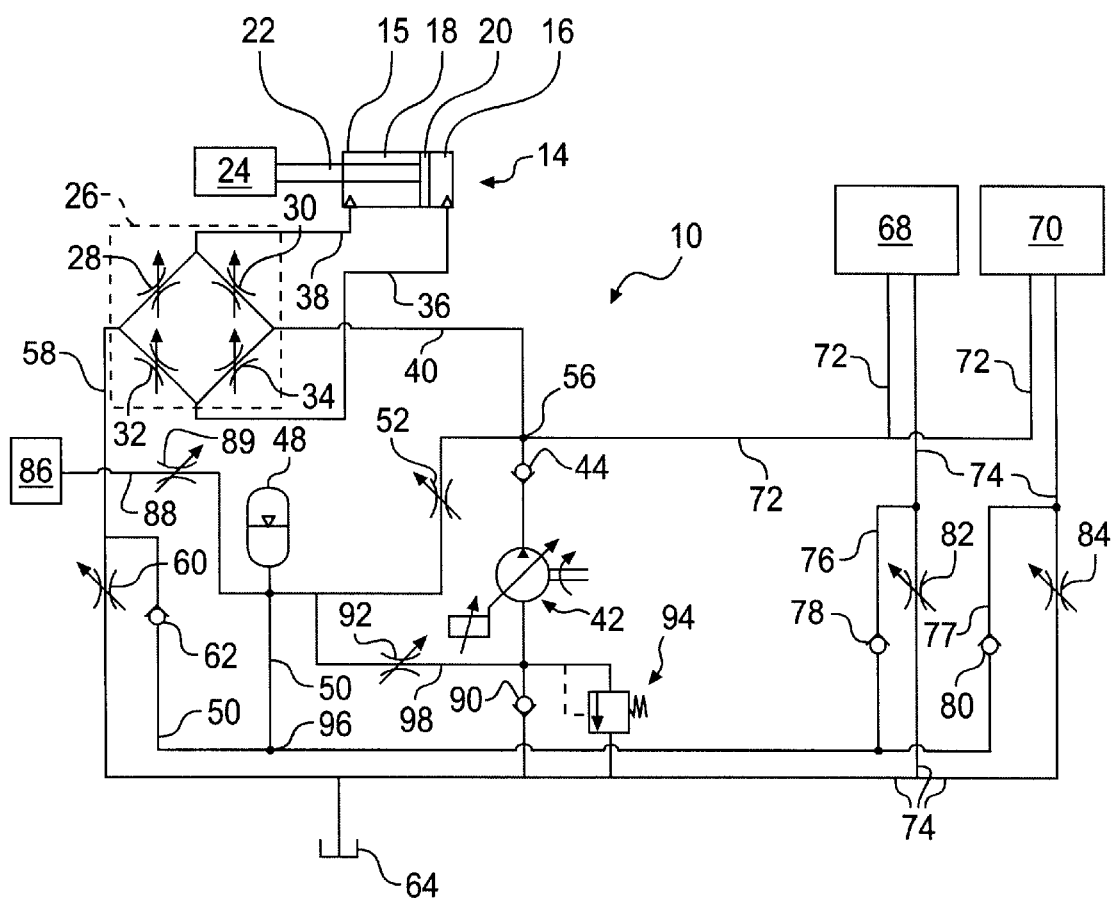
FIG. 3 is a is a schematic and diagrammatic illustration of a hydraulic system in accordance with still another exemplary embodiment of the present invention.

As illustrated in FIG. 3, additional storage control valves 82 and 84 may alternatively be placed in fluid lines 74 connecting second and third hydraulic actuators 68 and 70 with tank. These control valves 82 and 84 may be modulated to control the flow of fluid exiting second and third hydraulic actuators 68 and 70. When control valve 82 is closed, fluid released from second hydraulic actuator 68 is directed through a fluid line 76, a check valve 78, and a junction 96 to arrive at accumulator 48. When control valve 84 is closed, fluid released from third hydraulic actuator 70 is directed through a fluid line 77, a check valve 80, and junction 96 to arrive at accumulator 48. In this configuration, the fluid flow from each hydraulic actuator 14, 68, and 70 is individually controllable and may be individually directed to accumulator 48 or to tank 64.

It is contemplated that the control valves described above each may be two way proportional valves, and are preferably independent metering valves. The independent metering valves may be disposed along the fluid exit lines that connect each of the hydraulic actuators to the tank or in another appropriate location. The independent metering valves may be used to direct the flow of pressurized fluid released from each hydraulic actuator to either the tank or the accumulator.

As also illustrated in FIG. 3, an auxiliary device 86, such as, for example, a fan, implement pilot, steering motor, transmission control, pressurized oil supply, or brake accumulator, may also be powered by the pressurized fluid stored in accumulator 48. Auxiliary device 86 is connected to accumulator 48 through fluid line 88. A regeneration control valve 89 may be disposed in line 88 to control the flow of fluid to auxiliary device 86. Control valve 89 may be opened to allow pressurized fluid to flow from accumulator 48 to auxiliary device 86.

To use the pressurized fluid stored in accumulator for ride control in this embodiment, first metering valve 28, fourth metering valve 34, control valve 52 and control valve 60 are opened. This connects first chamber 16 with accumulator 48 and second chamber 18 with tank 64. In this configuration, the pressurized fluid within accumulator 48 absorbs the forces created within hydraulic system 10 when work implement 24 bounces and causes piston 20 to move within housing 15.

Fourth metering valve 34 and control valve 52 may each be modulated during ride control to meter the flow of fluid between the accumulator and the hydraulic actuator for adjusting damping characteristics provided by the pressurized fluid within accumulator 48. The modulation of fourth metering valve 34 and control valve 52 may be based on the pressure of the fluid within first chamber 16 and the relative position of piston 20 within housing 15.

In addition, it may be desirable to equalize the pressure of accumulator 48 and the pressure of the fluid within first chamber 16 before initiating the ride control function in order to prevent the work implement from dropping. To increase the pressure of the fluid within accumulator 48, control valve 52 may be opened to allow source of pressurized fluid 42 to add fluid to accumulator 48. To reduce the pressure of the fluid in accumulator 48, first metering valve 28, second metering valve 30, and control valve 60 are opened to allow fluid to escape from accumulator 48 to tank 64.

As shown in FIG. 2, accumulator 48 may include a plurality of housings of equal or different capacity, such as a first housing 49 and a second housing 51. First and second housings may be connected to fluid line 50 in parallel. This configuration may result in a reduced effective spring rate for the system, thereby reducing the amount of "bounce" of work implement 24 when the system is in the ride control mode. In addition, this configuration may allow the system to capture a higher percentage of the pressurized fluid released from the hydraulic actuator.

In addition, the pressurized fluid stored in accumulator 48 may also be used to charge source of pressurized fluid 42. As shown in FIG. 3, a fluid line 98 may connect accumulator 48 to the inlet side of source of pressurized fluid 42. A regeneration control valve 92 may be disposed in fluid line 98 to control the fluid flow through line 98. When control valve 92 is opened, fluid may flow through fluid line 98 to the inlet of source of pressurized fluid 42. A check valve 90 may be placed in fluid input line 40 to prevent fluid from flowing through line 98 to tank 64.

As illustrated in FIG. 3, a relief valve 94 may be disposed adjacent to the inlet of the source of pressurized fluid 42 to regulate the pressure of the fluid entering source of pressurized fluid 42. If the pressure of the fluid entering source of pressurized fluid 42 is too high, relief valve 94 will open and release fluid to tank 64. This configuration also provides an additional outlet through which pressurized fluid may exit the accumulator 48.

Industrial Applicability

As will be apparent from the foregoing description, the present invention provides a hydraulic system that can capture energy released from a hydraulic actuator which was previously throttled to tank and lost as heat, by storing the energy as pressurized fluid in an accumulator. This energy may be regenerated for use in one or more hydraulic actuators on the work machine. In addition, the accumulator may be used to provide a ride control function.

One mode of operation according to the present invention will now be described in connection with a wheel loader, by way of example only, in order to further illustrate benefits and advantages thereof. A lift cylinder and a tilt cylinder are commonly provided on a wheel loader to lift and tilt a front mounted bucket as it is driven into a pile of material, loading the bucket with the material.

In a hydraulic system constructed according to the present invention, when ride control is engaged the pressure in the accumulator is equalized to the pressure in the lift cylinder, in the simplest case by placing the two in fluid communication and allowing the lift height to drop or rise slightly. The loader then travels rapidly to a dumping location with ride control engaged. Once at the dumping location, or earlier if pressurized hydraulic fluid is required by an auxiliary device, ride control is disengaged by closing the directional control valve to the lift cylinder. The energy stored in the accumulator is then made available through the regeneration control valve at the pump outlet junction. For example, the stored energy may be used to tilt and dump the bucket at the dumping location. After dumping, the bucket is lowered toward the ground, with at least a portion of the fluid exiting the lift cylinder being stored under pressure in the accumulator for future energy regeneration or ride control needs.

The hydraulic system of the present invention may be implemented into an existing work machine without major modifications to the existing hydraulic system. The present invention will require the addition of a few control valves. No expensive additional hardware, such as pumps, hydraulic transformers, complicated valves, or extremely large accumulators, is required. Because the present invention does not require a motorable pump or hydraulic transformer, the hydraulic system avoids the potentially large losses that are typically associated with those devices and the need to charge the pump inlet.

It will be apparent to those skilled in the art that various modifications and variations can be made in the hydraulic system of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A hydraulic system, comprising:
   a hydraulic actuator;
   a source of pressurized fluid;
   a directional control valve controlling fluid flow into and out of said hydraulic actuator, said directional control valve having a fluid input line in communication with an output of said source of pressurized fluid, and a fluid output line;
   an accumulator disposed between said fluid input line and said fluid output line;
   a check valve directly connected between said fluid output line and said accumulator, said check valve adapted to control a flow of fluid between said fluid output line and said accumulator;
   a regeneration control valve disposed between said accumulator and the output of said source of pressurized fluid; and
   a storage control valve disposed between said fluid output line and a tank of the hydraulic system.

2. The system of claim 1, wherein said storage control valve is operable to meter to tank fluid released from the hydraulic actuator, causing at least a portion of the released fluid to be stored under pressure in said accumulator.

3. The system of claim 1, wherein the directional control valve comprises a plurality of independent metering valves.

4. The system of claim 1, wherein at least one of said regeneration control valve and said storage control valve is a two port proportional control valve.

5. The system of claim 1, wherein the hydraulic actuator is a hydraulic cylinder, and wherein said directional control valve and said regeneration control valve cooperate to selectively connect the accumulator with one chamber of the hydraulic cylinder.

6. The system of claim 5, wherein at least one of said direction control valve and said regeneration control valve are operable to modulate the flow of fluid between the accumulator and the hydraulic actuator.

7. The system of claim 1, further including a second hydraulic actuator, in fluid connection with the accumulator and a second storage control valve operable to control the flow of fluid from the second hydraulic actuator to tank.

8. The system of claim 1, further including a controller operable to adjust the position of the storage control valve based upon sensed pressure in the hydraulic system.

9. The system of claim 1, further including a regeneration control valve operable to release fluid stored under pressure in said accumulator to power an auxiliary device.

10. The system of claim 1, further including a second hydraulic actuator in fluid connection with the regeneration control valve and configured to receive pressurized fluid from the accumulator responsive to operation of the regeneration control valve.

11. A method regenerating energy in a system, comprising:

releasing pressurized fluid from one of a plurality of hydraulic actuators using a directional control valve;

storing at least a portion of the fluid released from said hydraulic actuator under pressure in an accumulator disposed between a fluid input line and a fluid output line of the directional control valve;

regenerating energy stored in the accumulator by releasing said fluid stored under pressure to operate one of said plurality of hydraulic actuators; and modifying the pressure of the fluid stored in the accumulator to equal the pressure of a chamber of one of said plurality of hydraulic actuators and connecting the accumulator to said chamber to provide ride control.

12. The method of claim 11, wherein the pressurized fluid is stored in the accumulator when a work implement connected to the hydraulic actuator is released from an elevated position to return to a lower position.

13. The method of claim 11, further including the step of powering an auxiliary device with the pressurized fluid stored in the accumulator.

14. The method of claim 11, further including the step of connecting the accumulator to a second of said plurality of hydraulic actuators to move the second of said plurality of hydraulic actuators with the stored pressurized fluid.

15. A work machine, comprising:

a work implement;

a first hydraulic actuator operatively connected to the work implement;

a source of pressurized fluid operable to provide pressurized fluid to the first hydraulic actuator;

a directional control valve operable to control the flow of fluid to and from the first hydraulic actuator;

an accumulator disposed between a fluid input line and a fluid output line of said directional control valve, wherein the directional control valve is further operable to connect the accumulator to the first hydraulic actuator to store fluid under pressure in the accumulator when the work implement is released from an elevated position;

a check valve directly connected between said fluid output line and said accumulator, said check valve adapted to control a flow of fluid between said fluid output line and said accumulator; and a regeneration control valve disposed between said accumulator and the output of said source of pressurized fluid, said regeneration control valve operable to regenerate energy stored in the accumulator.

16. The machine of claim 15, further including a fan having a motor, the accumulator connected to the fan motor to drive the fan motor with pressurized fluid.

17. The machine of claim 15, further including a second hydraulic actuator in fluid connection with said regeneration control valve such that the accumulator receives pressurized fluid released by the first hydraulic actuator and provides pressurized fluid to the second hydraulic actuator to move the second hydraulic actuator.

18. The machine of claim 17, further including a tank in fluid connection with the first and second hydraulic actuator, and at least one storage control valve disposed between the first and second hydraulic actuator and the tank.

19. The machine of claim 17, wherein a second check valve is disposed between the second hydraulic actuator and the accumulator.

20. A hydraulic system, comprising:

a hydraulic actuator;

a source of pressurized fluid having an inlet;

a directional control valve controlling fluid flow into and out of said hydraulic actuator, said directional control valve having a fluid input line in communication with an output of said source of pressurized fluid, and a fluid output line;

an accumulator disposed between said fluid input line and said fluid output line;

a regeneration control valve disposed between said accumulator and the output of said source of pressurized fluid;

a storage control valve disposed between said fluid output line and a tank of the hydraulic system; and a control valve disposed between the accumulator and the inlet of the source of pressurized fluid.

21. The system of claim 20, further including a second hydraulic actuator in fluid connection with the regeneration control valve and configured to receive pressurized fluid from the accumulator responsive to operation of the regeneration control valve.

22. The system of claim 20, wherein said storage control valve is operable to meter to tank fluid released from the hydraulic actuator, causing at least a portion of the released fluid to be stored under pressure in said accumulator.

23. The system of claim 20, wherein the directional control valve comprises a plurality of independent metering valves.

24. The system of claim 20, further including a controller operable to adjust the position of the storage control valve based upon sensed pressure in the hydraulic system.

* * * * *